(No Model.)
L. WHITE & B. S. BIGELOW.
JOINT AND METALLIC CYLINDER AND METHOD OF PRODUCING THE SAME.
No. 468,298. Patented Feb. 2, 1892.
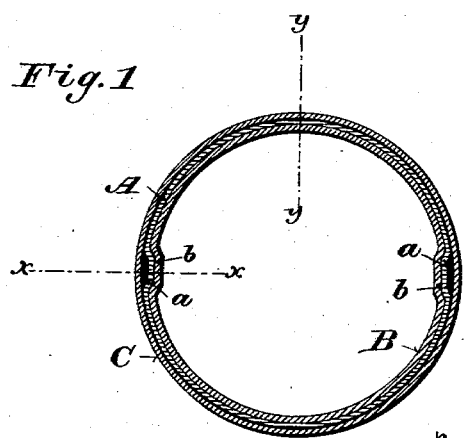
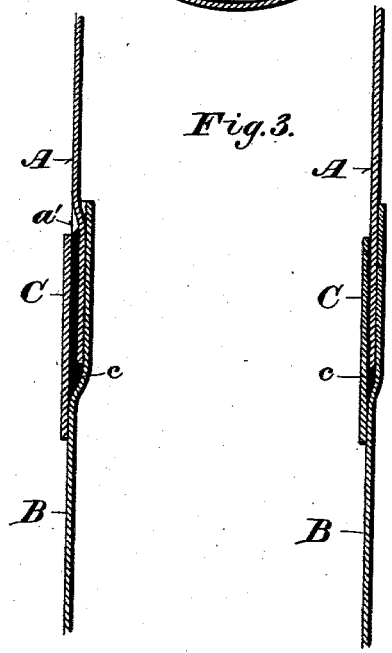
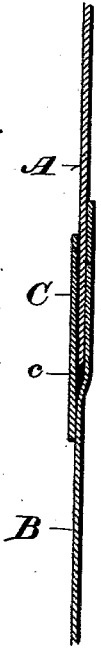
Witnesses:
Eb Amus
Chas. L. Goss.
Inventors,
Lyman White,
Buel S. Bigelow,
By Winkler, Flanders, Smith, Bottum & Vilas,
Attorneys.

UNITED STATES PATENT OFFICE.

LYMAN WHITE AND BUEL S. BIGELOW, OF MILWAUKEE, WISCONSIN, ASSIGNORS TO THE SEAMLESS STRUCTURAL COMPANY, OF SAME PLACE.

JOINT AND METALLIC CYLINDER AND METHOD OF PRODUCING THE SAME.

SPECIFICATION forming part of Letters Patent No. 468,298, dated February 2, 1892.

Application filed April 13, 1891. Serial No. 388,653. (No model.)

*To all whom it may concern:*

Be it known that we, LYMAN WHITE and BUEL S. BIGELOW, both of Milwaukee, in the county of Milwaukee and State of Wisconsin, have invented certain new and useful Improvements in Joints and Method of Producing the Same for Metallic Cylinders, &c.; and we do hereby declare that the following is a full, clear, and exact description of the invention, which will enable others skilled in the art to which it pertains to make and use the same, reference being had to the accompanying drawings, and to the letters of reference marked thereon, which form a part of this specification.

The object of our invention is to unite the sections of various kinds of metallic tubes, cylinders, and the like by a strong, tight, and durable joint.

It consists of certain peculiarities in the construction of the joint and in the method of forming the same, hereinafter particularly described, and pointed out in the claims.

In the accompanying drawings like letters designate the same parts in the several figures.

Figure 1 is a cross-section of the joint taken in a plane cutting the axis of the cylinder at right angles. Fig. 2 is a longitudinal section on the line $x\,x$ Fig. 1, and Fig. 3 is a similar section on the line $y\,y$, Fig. 1.

A and B represent the sections to be united. Section B is contracted at one end, as shown in Figs. 2 and 3, sufficiently to fit inside of the adjacent end of section A, with which it is to be united. In the outer faces of the sections to be joined are impressed longitudinal grooves or indentations $a\,b$. The indentations $a$ fit on the inside into the grooves $b$ in section B. Two or more sets of these grooves or depressions are preferably made in opposite sides of the sections, as shown in Fig. 1, but a single groove in each section is sufficient to produce the joint.

C represents a band, which is placed, as shown in Fig. 3, around the joint and fitted snugly to the outside of the sections, projecting a short distance over the edge of section A, so as to cover the contracted portion of section B, exposed beyond the edge of section A, and to form an annular channel $c$, as shown in Figs. 2 and 3. The edge of section B is made to project a short distance above the adjacent edge of the band C, which is placed so as to leave exposed the ends of the grooves $a$ in section A, and thus afford openings $a'$ of sufficient size for the introduction of solder into the joint. The inner and outer surfaces of section A, the outer surface of section B, and the inner surface of the band C, which overlap each other in forming the joint, are first tinned and then assembled as shown in the drawings, the section A being placed uppermost in a vertical position. Heat is then applied to the outside of the joint. This may be effected by means of a ring, inside of which the cylinder is placed, having a series of apertures or gas-jets on the inside, directed toward the cylinder. Solder is then poured into the openings $a'$ at the upper edge of the band C and flows through the grooves $a\,a$ into the annular channel $c$, from which it gradually finds its way into the interstices between the faces of the sections and the band C, surrounding them. The vertical grooves $a$ are kept filled until the solder finds its way to the upper edge of the band C entirely around the cylinder. The solder thus appearing around the entire upper edge of the band C indicates that it has completely filled the space between the outer face of section A and the band C, from the annular recess $c$ to the upper edge of said band, and affords certain proof that the overlapping edges of the joint are effectually united. This is a great advantage over the methods heretofore practiced of forming joints of this class, inasmuch as it has been impossible to determine with certainty whether the molten solder had found its way to all parts of the surfaces to be united.

While the joint is being formed the lower edge of the band C is luted to prevent the solder from escaping at that point. It has been found more or less difficult heretofore to secure an even and certain flow of the molten solder to all parts of the joint. By the construction and method hereinbefore described the vertical grooves or indentations $a\,a$ and the annular recess $c$ constitute a channel and reservoir from which the molten solder is readily and directly supplied to all parts of the joint. The grooves $a\ a$ also afford a head by which the solder is carried upward from the annular recess $c$ between the surfaces to be united.

We claim—

1. The method of joining sections of metallic tubes, cylinders, and the like, which consists of producing a longitudinal groove in the outer face of the overlapping section, lapping the ends, placing a band around the lap so as to inclose at the end of the overlapping section an annular recess communicating with one end of said groove, and filling said recess through said groove with molten solder, the sections to be joined being held in an upright position during the operation, substantially as and for the purposes set forth.

2. The method of joining sections of metallic tubes, cylinders, and the like, which consists of forming a longitudinal groove in the outer face of the overlapping section, lapping the ends of the sections to be joined, placing a band around the lap so as to inclose one end of said groove and an annular recess at the end of the overlapping section communicating with said groove, heating the lap and filling the interstices of the joint while hot with molten solder by pouring the same into the upper end of said groove, the sections to be united being held in an upright position during the operation, substantially as and for the purposes set forth.

3. The method of joining sections of metallic tubes, cylinders, and the like, which consists of forming a longitudinal groove in the outer face of the overlapping section, lapping the ends of the sections to be joined, placing a band around the lap so as to inclose one end of the said groove and an annular recess communicating therewith at the end of the overlapping section, and in filling said annular recess and groove with molten solder and keeping the same filled and in a molten condition until the solder rises to the upper edge of said band entirely around the joint, substantially as and for the purposes set forth.

4. A joint for uniting sections of metallic tubes, cylinders, and the like, comprising the lapped ends of the united sections, a longitudinal groove being formed in the outer face of the overlapping section and a metallic band placed around the lap and inclosing at the end of the overlapping section an annular recess, which communicates with one end of said groove, said groove and recess being filled with solder which unites the adjacent surfaces, substantially as and for the purposes set forth.

In testimony that we claim the foregoing as our own we affix our signatures in presence of two witnesses.

LYMAN WHITE.
BUEL S. BIGELOW.

Witnesses:
FRANK A. KREHLA,
CHAS. L. GOSS.

It is hereby certified that in Letters Patent No. 468,298, granted February 2, 1892, upon the application of Lyman White and Buel S. Bigelow, of Milwaukee, Wisconsin, the title of the invention was erroneously written and printed "Joint and Metallic Cylinder and Method of Producing the Same," whereas the said title should have been written and printed *Joints and Methods of Producing the Same for Metallic Cylinders, etc.;* and that the said Letters Patent should be read with this correction therein that the same may conform to the record of the case in the Patent Office.

Signed, countersigned, and sealed this 23d day of February, A. D. 1892.

[SEAL.]                                  CYRUS BUSSEY,
*Assistant Secretary of the Interior.*

Countersigned:
    W. E. SIMONDS,
        *Commissioner of Patents.*